United States Patent [19]

Kazahaya

[11] Patent Number: 4,754,365
[45] Date of Patent: Jun. 28, 1988

[54] DIFFERENTIAL PRESSURE TRANSDUCER

[75] Inventor: Masahiro Kazahaya, Southampton, Pa.

[73] Assignee: Fischer & Porter Company, Warminster, Pa.

[21] Appl. No.: 61,446

[22] Filed: Jun. 15, 1987

[51] Int. Cl.[4] .......................... H01G 7/00; G01L 9/12
[52] U.S. Cl. ...................................... 361/283; 73/718
[58] Field of Search ................... 361/283; 73/718, 724

[56] References Cited

U.S. PATENT DOCUMENTS

| | | | |
|---|---|---|---|
| 3,620,083 | 11/1971 | Dimeff et al. ................... | 73/718 X |
| 4,398,194 | 8/1983 | Johnston ......................... | 73/724 X |
| 4,598,590 | 7/1986 | Busch-Vishniac et al. ......... | 73/724 |
| 4,680,971 | 7/1987 | Kavli et al. . | |

Primary Examiner—Donald A. Griffin
Attorney, Agent, or Firm—Michael Ebert

[57] ABSTRACT

A differential pressure-transducer of the capacitive type that includes a drum-shaped insulating body whose flat opposing faces each have a circular back-up nest indented therein covered by an insulating diaphragm to define a cavity. The underside of each diaphragm is metallized as is the base of the related nest to form the electrodes of a variable capacitor whose value depends on the degree and direction of diaphragm deflection. Interconnecting the cavities is a plurality of internal ducts of small diameter that extend between the bases of the nests. Admitted through one of the ducts and filling the cavities is an incompressible dielectric fluid. Hence when an increase in high pressure applied to the face of one diaphragm acts to deflect this diaphragm inwardly, the fluid in the related nest is forced through the ducts into the nest for the low pressure diaphragm which is then deflected outwardly. Because the combined diameter of the ducts is relatively large, the resultant flow path is substantially unrestricted and the time constant of the transducer is short. And even when the diaphragm is deflected inwardly to an extent causing it to abut the base of the related back-up nest and to block one or more of the ducts, the remaining ducts remain free and prevent latching of the diaphragm caused by vacuum effects or surface tension of the fluid.

5 Claims, 1 Drawing Sheet

DIFFERENTIAL PRESSURE TRANSDUCER

BACKGROUND OF INVENTION

1. Field of Invention

This invention relates generally to differential-pressure transducers of the capacitive type, and more particularly to a transducer having a pair of diaphragms, one responsive to an applied high pressure and the other to an applied low pressure, each diaphragm functioning as the movable electrode of a variable capacitor.

2. Status of Prior Art

It is known in industrial process control systems to use differential-pressure (D-P) transducers for flow measurement. Thus to determine the flow rate of a process fluid (liquid or gas) in a pipeline, an aperture plate is interposed therein and a differential pressure transducer acts to sense the degree of pressure drop developed between opposite sides of the aperture plate. This drop is directly related to flow rate. (The pressure drop is proportional to the square of the flow rate.)

One simple form of differential pressure transducer of the capacitive type consists of a case divided by an electrically conductive diaphragm into a pair of chambers, each having a stationary electrode mounted therein to define with the conductive diaphragm a capacitor whose value varies as the diaphragm is deflected. Low fluid pressure from the aperture plate is applied to one chamber and high pressure to the other.

In this known form of D-P transducer, the conductive diaphragm and the stationary electrodes on either side thereof form a three-terminal capacitive potentiometer in which the diaphragm is the variable element. By arranging this element in a bridge circuit excited by a voltage of, say, 10 kHz, the capacitance changes caused by diaphragm deflection unbalance the bridge to produce a 10 kHz output whose amplitude is directly proportional to pressure.

German patent publication No. 23 64 027 discloses a D-P transducer consisting of a hollow metal cylinder having an insulating body therein, with diaphragms welded to either end to enclose interconnected cavities filled with an incompressible fluid. These diaphragms form capacitors in conjunction with film electrodes mounted on opposing faces of the insulating body. Because the metal diaphragms carry an electrical potential, sparking may occur between the diaphragms and grounded parts adjacent thereto. Such sparking represents a hazard should the fluid being metered be ignitable.

A similar D-P transducer arrangement using metal diaphragms is disclosed in U.S. Pat. No. 4,398,194 to Johnson in which the transducer is formed by a pair of opposing sensing chambers bounded by these diaphragms which in conjunction with conductive layers coated on an insulating body form variable capacitors. The cavities created between the diaphragms and the body are filled with an incompressible dielectric fluid and are interconnected by a single duct going through the body. Also of prior art background interest are the patents to Paquin et al., U.S. Pat. No. 4,301,492 and Bell et al., U.S. Pat. No. 4,458,537.

The prior art reference of greatest interest is the Orlowski et al. U.S. Pat. No. 4,531,415. This patent discloses a D-P transducer in which the diaphragms are made of ceramic or other insulating corrosion-resistant material and have on their inner surfaces film electrodes which face the end surfaces of an insulating body on which stationary electrodes are formed. Hence the outer surfaces of the diaphragms can be exposed to either corrosive or non-corrosive process fluids.

In Orlowski et al., the insulating body together with the diaphragms define a pair of cavities which are filled with silicone oil or other dielectric fluid via a single filling duct in the body. In order to prevent damage to the diaphragms as a result of overdrive caused by excessively large input pressure differences, deflection of each diaphragm is limited by raised supports on the surfaces of the insulating body facing the diaphragm. Groove-like recesses are formed in these supports which are connected to the filling duct in the body, so that in the case of an abrupt pressure variation, the oil can be quickly distributed, thereby substantially reducing the response time of the transducer.

SUMMARY OF INVENTION

In view of the foregoing, the main object of this invention is to provide a highly sensitive D-P transducer of the capacitive type which operates efficiently and reliably.

More particularly, an object of this invention is to provide D-P transducer of the above type which has a rapid response time to change in applied pressure, and in which the diaphragms are of insulating, corrosion resistant material and hence are not damaged by chemically active process fluid.

A significant feature of the invention is that the diaphragms are protected against overdrive damage and also from latching as a result of an excessive pressure applied thereto. Such latching may occur because of a vacuum preventing the return of the diaphragm or by reason of fluid surface tension.

Briefly stated, these objects are attained in a differential pressure-transducer of the capacitive type that includes a drum-shaped insulating body whose opposing faces each have a circular back-up nest indented therein covered by an insulating diaphragm to define a cavity; the nest has no raised support. The underside of each diaphragm is metallized as is the base of the related nest to form the electrodes of a variable capacitor whose value depends on the degree and direction of diaphragm deflection. Interconnecting the cavities is a plurality of internal ducts of small diameter that extend between the bases of the nests. Admitted through one of the ducts and filling the cavities is an incompressible dielectric fluid. Hence when an increase in high pressure applied to the face of one diaphragm acts to deflect this diaphragm inwardly, the fluid in the related nest is forced through the ducts into the nest for the low pressure diaphragm which is then deflected outwardly. Because the combined diameter of the ducts is relatively large, the resultant flow path is substantially unrestricted and the time constant of the transducer is short. And even when the diaphragm is deflected inwardly to an extent causing it to abut the base of the related back-up nest and to block one or more of the ducts, the remaining ducts remain free and prevent vacuum latching of the diaphragm or latching because of surface tension.

BRIEF DESCRIPTION OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
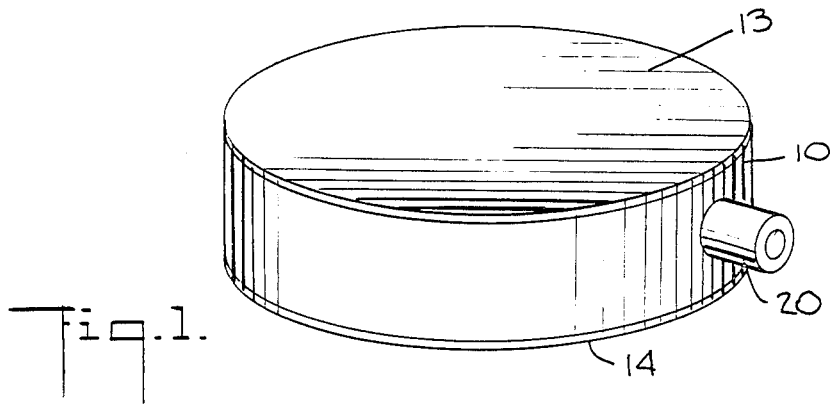
FIG. 1 is a perspective view of a D-P transducer in accordance with the invention.
Figure 2:
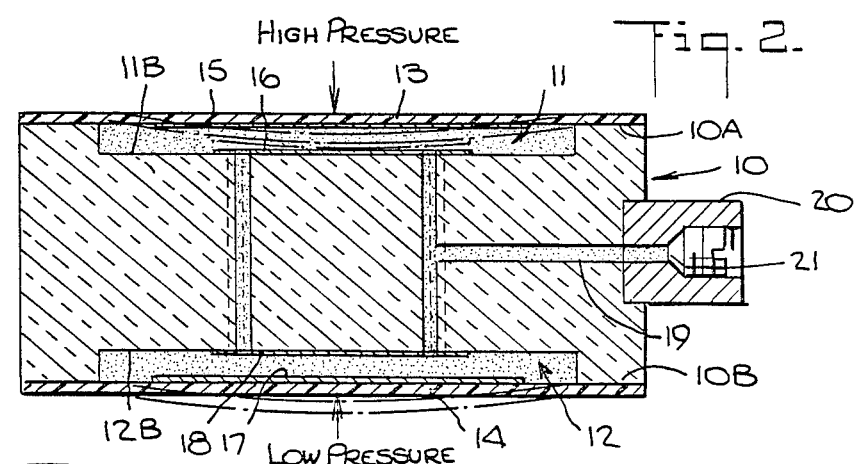
FIG. 2 is a section taken through the transducer.
Figure 3:
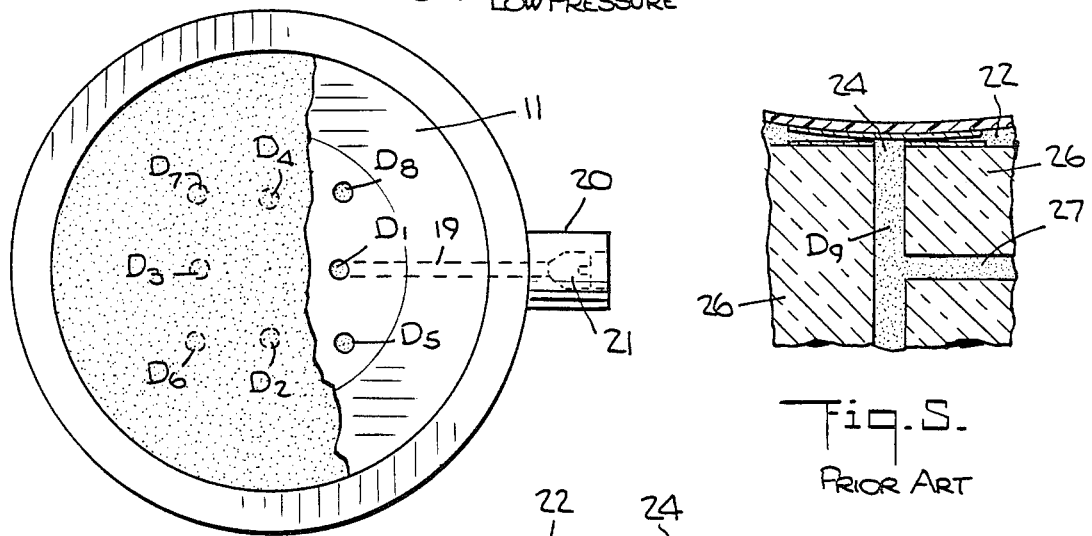
FIG. 3 is a plan view of one face of the transducer body with the diaphragm removed therefrom.

Referring now to FIGS. 1 to 3, there is shown a D-P transducer of the capacitive type in accordance with the invention, the transducer including a drum-shaped insulating body 10 formed of glass, ceramic, sapphire or any other suitable insulating material having good structural properties and which is substantially insensitive to changes in temperature.

The opposing flat faces 10A and 10B of the body have circular back-up nests 11 and 12 indented therein. Covering nest 11 is a diaphragm 13 of deflectable, insulating corrosion-resistant material such as a thin, disc-shaped ceramic plate, the circular margin of diaphragm 13 being cemented or otherwise bonded to the annular bank surrounding nest 11. The back-up nest 11 sealed by diaphragm 13 defines a cavity, diaphragm 13 being responsive to an applied high pressure.

In a like manner, back-up nest 12 is sealed by a deflectable diaphragm 14 responsive to an applied low pressure to define a second cavity. It is to be understood that the two diaphragms and the cavities formed thereby are identical, and that in practice the pressure relationship may be reversed, with high pressure derived from the aperture plate in the line carrying the fluid to be metered being applied to diaphragm 14, while low pressure is applied to diaphragm 13.

The undersurface of diaphragm 13 is metallized as by vacuum deposition or by thick-film techniques. Or a foil of highly conductive metal such as gold or silver is bonded to this surface to create a movable electrode 15. Similarly formed on base 11B of nest 11 is a stationary electrode 16. Electrodes 15 and 16 form a variable capacitor whose capacitance value varies as a function of diaphragm deflection.

In a like manner, an electrode 17 is formed on the underside of diaphragm 14 and a stationary electrode 18 is formed on base 12B of nest 12 to create a second variable capacitor. The extent to which each diaphragm is permitted to deflect is limited by its back up nest, the limit being the maximum pressure in the pressure range for which the transducer is designed. Pressure in excess of maximum results in overdrive of the diaphragm.

Thus, as shown in dotted lines in FIG. 2, when the high pressure applied to diaphragm 13 reaches the excessive value in the range, it is deflected until the diaphragm abuts base 11B of the related nest. Any further rise in pressure produces no further deflection of the diaphragm, thereby avoiding a damaging overdrive of the diaphragm. Because the cavities defined by the diaphragms and their back-up nests are filled with an incompressible dielectric fluid and the cavities are interconnected by internal ducts extending through body 10, when diaphragm 13 is deflected by an applied high pressure, this action forces the dielectric fluid in the related cavity through the ducts to the other cavity and causes outward deflection of diaphragm 14 to which low pressure is applied.

The degree to which diaphragm 13 is deflected inwardly and diaphragm 14 is concurrently deflected outwardly depends on the prevailing ratio of the applied high and low pressures of the fluid being metered, and hence on its flow rate. This is reflected in the resultant ratio of the capacitance values of the variable capacitors included in the D-P transducer.

The internal ducts which interconnect the two cavities are constituted by an inner ring of four small diameter ducts $D_1$ to $D_4$ which are equi-spaced 60 degrees apart, and a concentric outer ring of four small diameter ducts $D_5$ to $D_8$ which are also equi-spaced 60 degrees apart to provide an array of eight internal ducts. Each duct extends in the body between base 11B of nest 11 and base 12B of nest 12.

Internal duct $D_1$ also functions as a filling duct which communicates through a lateral internal bore 19 to an inlet fixture 20 mounted on the side of body 10 and provided with a removable fill plug 21. Hence to fill the cavities with the dielectric fluid, the fluid which is injected into bore 19 flows in opposite directions through filling duct $D_1$ into the cavities. The filling fluid may, for example, be silicone oil, a polymer of trifluorovinylchloride or any other suitable incompressible dielectric fluid having a high dielectric constant.

In known forms of D-P transducers in which there is only a single duct interconnecting the cavities which also functions as the filling duct, if the diameter of this duct is small, it provides a restricted flow path between the cavities; hence when the high pressure diaphragm is deflected to force fluid from the related cavity into the low pressure cavity, the flow path restriction slows down flow. As a consequence, the transducer has a long time constant that is unacceptable (i.e., 5 to 6 seconds). The desired time constant is short and is usually about one second or less.

In the present invention, because the combined or aggregate diameter of the array of small diameter ducts is large, the resultant flow path interconnecting the chamber is substantially unrestricted, and the time constant of the transducer is short; i.e., about one second or less. Hence the transducer responds quickly to a change in pressure.

Figure 4:
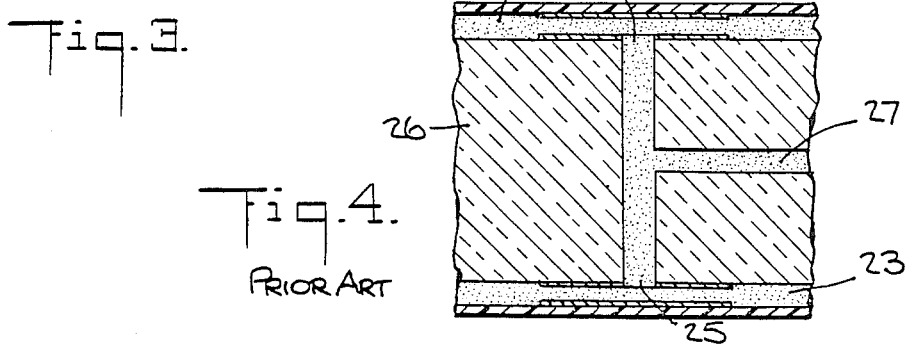
FIG. 4 illustrates the structure of a D-P transducer which has only a single duct interconnecting the cavities.

One could achieve the same short time constant by using a single filling duct of large diameter, such as duct $D_9$ shown in FIG. 4 interconnecting nests 22 and 23 sealed by diaphragms 24 and 25, respectively, the body 26 having an internal bore 27 communicating with duct $D_9$ to admit a filling fluid therein.

Figure 5:
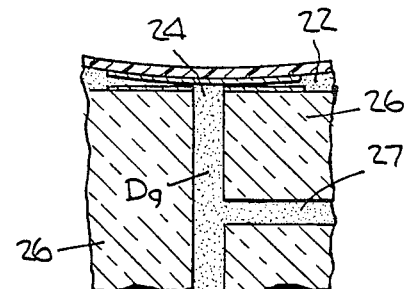
FIG. 5 illustrates why diaphragm latching occurs in this single duct transducer.

However, a single large diameter filling duct as in prior art transducers has serious drawbacks; for, as shown in FIG. 5, when diaphragm 24 is overdriven, it abuts the base of nest 22 and blocks duct 26. Because the pressure on the diaphragm is very high and the diameter of the duct is large, the diaphragm presses against the duct entry and seeks to bulge into the entry to plug the duct, which stress may be damaging to the diaphragm.

Then when excessive pressure on the diaphragm is relieved so that the deflectable diaphragm now seeks to recover its normal position, in trying to pull away from the duct entry, a vacuum and a surface tension is created between the diaphragm and the entry which resists such diaphragm movement. Hence the diaphragm is effectively latched and the transducer is no longer operative.

But with the present invention which provides multiple ducts of small diameter, even though the diaphragm under overdrive pressure conditions may block one or more ducts, particularly those in the inner ring thereof, because of the small diameter of these ducts, the diaphragm cannot be stressed to bulge into the entries thereof, and the remaining ducts which are unblocked prevent a vacuum latching action.

While there has been shown and described a preferred embodiment of a differential pressure-transducer in accordance with the invention, it will be appreciated that many changes and modifications may be made therein without, however, departing from the essential spirit thereof.

I claim:

1. A differential pressure transducer comprising:

A an insulating body provided with a pair of opposing flat faces having back up nests indented therein, each having a base;

B a pair of deflectable diaphragms of insulating, corrosion resistant material covering said nests and sealed to said faces to define a pair of cavities;

C an electrode formed on the underside of each diaphragm and an electrode formed on the base of the related nest to define a variable capacitor whose capacitance varies as a function of diaphragm deflection; and D a plurality of internal ducts in said body interconnecting the cavities, each having a small diameter and extending between the bases of the nests, one of said ducts functioning as a filling duct for a dielectric fluid to fill said cavities and said ducts, said body having an internal bore therein communicating with said filling duct and terminating in a fluid inlet fixture mounted on a side of the body whereby when pressure is applied to one of said diaphragms to deflect it inwardly, the fluid in the related nest is forced through the ducts into the nest of the other diaphragm which is then deflected outwardly, the combined diameter of the ducts being relatively large to provide a flow path between the nests which is substantially unrestricted and a resultant transducer time constant which is short, said flexible diaphragms being spaced a sufficient distance from said ducts and said ducts being spaced sufficiently from each other so as to protect same from overdrive damage and from latching as a result of excessive pressure being applied thereto.

2. A transducer as set forth in claim 1, wherein said body is formed of a material selected from the glass constituted by ceramic, glass and sapphire.

3. A transducer as set forth in claim 2, wherein said diaphragms are cemented to the faces of the body and are formed of the same material.

4. A transducer as set forth in claim 1, wherein said electrodes are formed by metallizing the surfaces to which they are applied.

5. A transducer as set forth in claim 1, wherein said ducts are in an array formed by equi-spaced ducts in an inner ring and a like number of equi-spaced ducts in an outer ring concentric to the inner ring.

* * * * *